Figure 1:
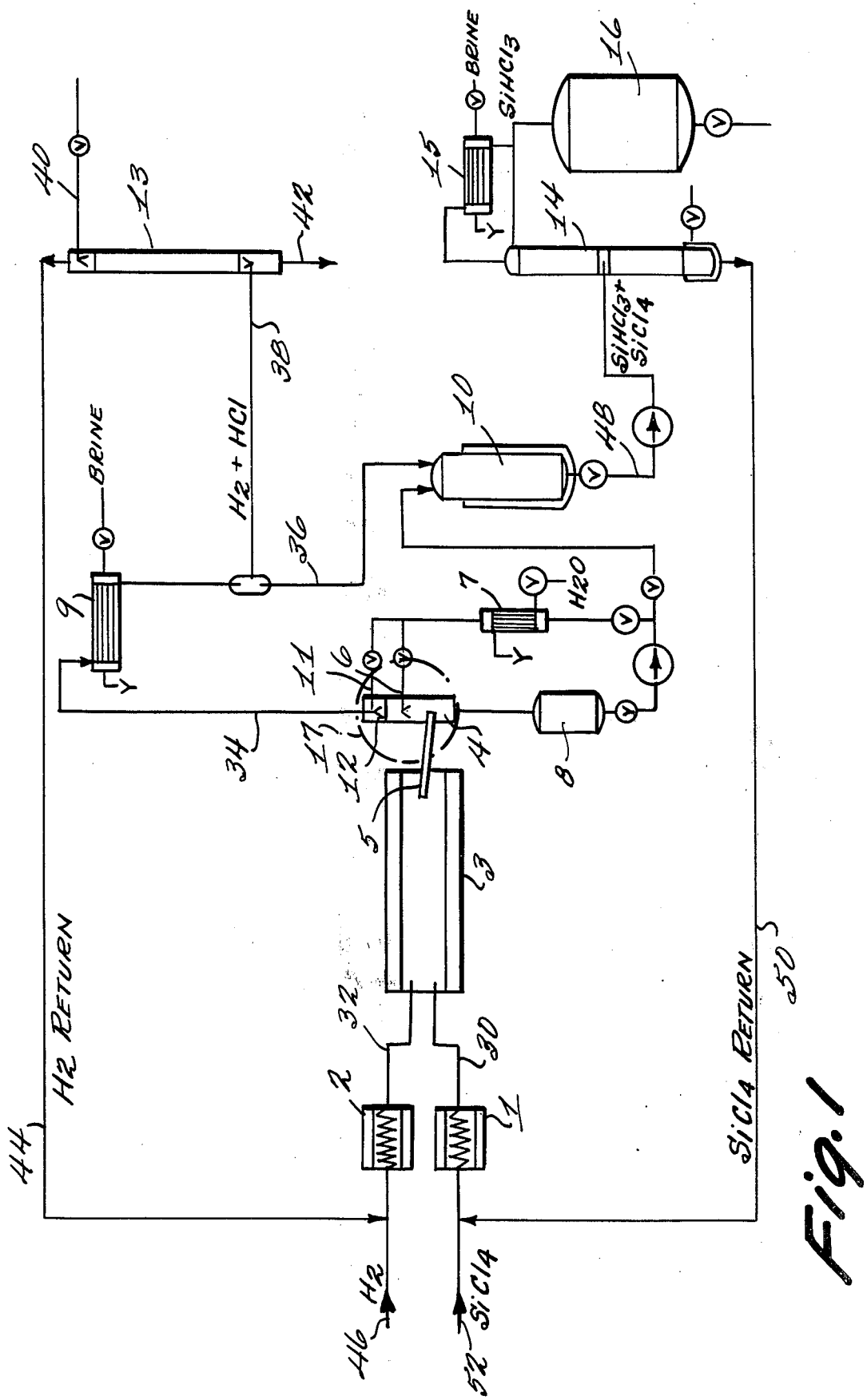

United States Patent [19]
Weigert et al.

[11] 4,165,363
[45] Aug. 21, 1979

[54] PROCESS FOR THE PRODUCTION OF CHLOROSILANES

[75] Inventors: Wolfgang Weigert, Offenbach; Eugen Meyer-Simon, Frankfurt; Rudolf Schwarz, Wasserlos, all of Fed. Rep. of Germany

[73] Assignee: Deutsche Gold- und Silber-Scheideanstalt vormals Roessler, Frankfurt, Fed. Rep. of Germany

[21] Appl. No.: 328,362

[22] Filed: Jan. 31, 1973

[30] Foreign Application Priority Data

Feb. 26, 1972 [DE] Fed. Rep. of Germany ....... 2209267

[51] Int. Cl.² .............................................. C01B 33/08
[52] U.S. Cl. .................................................... 423/342
[58] Field of Search ........................................ 423/342

[56] References Cited

U.S. PATENT DOCUMENTS

| 2,458,703 | 1/1949 | Hatcher | 423/342 |
|---|---|---|---|
| 2,768,061 | 10/1956 | Cook et al. | 423/276 |
| 2,875,028 | 2/1959 | Winternitz | 23/252 R X |
| 2,999,733 | 9/1961 | Groves | 423/74 |
| 3,147,071 | 9/1964 | Jenkner | 423/342 |
| 3,933,985 | 1/1976 | Rodgers | 423/350 |

FOREIGN PATENT DOCUMENTS

| 4633307 | 2/1950 | Canada | 423/342 |
|---|---|---|---|
| 904009 | 8/1962 | United Kingdom | 423/342 |

OTHER PUBLICATIONS

Handbook of Chemistry and Physics, 43rd ed., 1962, p. 2321, The Chemical Rubber Publishing Co., Cleveland, Ohio.
Hurd, "Chemistry of the Hydrides", 1952, p. 65.
J. W. Mellor's, "A Comprehensive Treatise on Inorganic and Theoretical Chemistry", vol. 6, 1925, p. 964, Longmans, Green & Co., N.Y.

*Primary Examiner*—G. O. Peters
*Attorney, Agent, or Firm*—Cushman, Darby & Cushman

[57] ABSTRACT

Hydrogen containing chlorosilanes, preferably trichlorosilanes, are prepared by reacting silicon tetrachloride with hydrogen at a temperature of 600°–1200° C. with a $SiCl_4/H_2$ mixture having a molar composition between 1:1 and 1:50 in equilibrium with $SiHCl_3$ and HCl and suddenly quenching the mixture to below 300° C.

12 Claims, 2 Drawing Figures

PROCESS FOR THE PRODUCTION OF CHLOROSILANES

The invention is directed to a process for the production of hydrogen containing chlorosilanes, especially trichlorosilane, by reaction of silicon tetrachloride with hydrogen.

It is known to produce silicochloroform by reaction of silicon and hydrogen chloride wherein the yield of silicochloroform can be influenced by suitable temperature control, (see Enk, German Pat. No. 1,105,398).

It is also known to produce silicochloroform and/or silicon by bringing silicon tetrachloride and hydrogen to an equilibrium reaction according to the equations $$SiCl_4 + H_2 \rightleftharpoons SiHCl_3 + HCl \text{ or}$$

$$SiCl_4 + 2H_2 \rightleftharpoons Si + 4HCl$$

whereby mentionable yields of silicochloroform or silicon are obtained if the simultaneously formed hydrogen chloride is removed from the equilibrium by metals, for example, zinc or aluminum with formation of $ZnCl_2$ or $AlCl_3$. (Enk German Auslegeschrift 1,105,397).

An object of the present invention is to develop a process for the production of hydrogen containing chlorosilanes, especially trichlorosilane, by reaction of silicon tetrachloride with hydrogen which is characterized by reacting at a temperature of 600°–1200° C., a $SiCl_4/H_2$ mixture having a molar composition between 1:1 and 1:50 in equilibrium with $SiHCl_3$ and HCl and suddenly quenching the mixture to below 300° C. The temperature can even be quenched to room temperature or below, the minimum quenching temperature is not critical. In a given case after condensation of the crude product and separation of the unreacted hydrogen, the hydrogen containing chlorosilanes, e.g. silicochloroform, are recovered by fractional distillation.

The invention is thus based on the idea of undertaking a regulation of the equilibrium between $SiCl_4$ and $H_2$ in the sense of the equation $$SiCl_4 + H_2 \rightleftharpoons SiHCl_3 + HCl$$

at temperatures at which the equilibrium is shifted strongly to the side of $SiHCl_3$ and HCl and then to "freeze" the thus established equilibrium directly by sudden cooling. Since $SiHCl_3$ and HCl no longer react with each other at temperatures below 300° C., the equilibrium mixture is quenched to a temperature lying below this value. The equilibrium mixture must be removed from the equilibrium zone as quickly as possible, and be cooled spontaneously. The most favorable time interval between withdrawal from the reaction zone and the subsequent quenching for the most part is below one second.

An accelerated establishment of the reaction equilibrium can be produced if there is provided a catalyst, especially an activated carbon catalyst. Thereby it is possible to reduce the residence time of the $SiCl_4/H_2$ gas mixture in the reaction zone.

The unreacted hydrogen admixed with the crude product can be returned again to the reaction zone.

The obtainable reaction of $SiCl_4$ to $SiHCl_3$ in a single passage through the reactor according to the process of the invention can be up to 80% of theory by a suitable carrying out of the reactions. It is favored especially at high temperatures within the indicated reaction temperature range. According to a suitable illustrative form of the invention, the reaction equilibrium is regulated at a temperature between 900° and 1100° C.

For the starting mixture $SiCl_4/H_2$, there is suitably used a molar ratio between 1:3 and 1:15 although a wider range in ratios can be employed as indicated supra. Suitable residence times of the reactants in the reaction zone are in the range of 0.5 to 20 seconds. The quenching time is chiefly below 1 second. A preferred process according to the invention provides that the equilibrium mixture goes through the reduction in temperature between the reaction temperature and the temperature present after quenching in a time interval of 0.05 to 0.5 second. This time interval is established by means of the velocity of flow of the reaction mixture from the reaction zone to the quenching place and by suitable cooling measures. For reaction on a laboratory scale, there can be selected, for example, a velocity of flow of the gaseous reactants $SiCl_4$ and $H_4$ in the range of between 2 and 20 meters/second and quenching in a water cooled apparatus. To intensify the cooling effect besides the use of constructive precautions, there can be applied to the cooling medium temperatures below room temperature. In carrying out the process in a manner suitable for industrial practice, however, there are always used cooling conditions which effect a far going spontaneous quenching of the reaction mixture. For ascertaining the above mentioned time interval, therefore a measurement of the speed of flow is suitable.

According to a form of the invention especially practical for small reactor units, the equilibrium mixture is withdrawn by means of a probe immersed in the reaction zone and it is led into a cooling apparatus, e.g. a heat exchanger directly connected thereto. The probe suitably has a smaller cross-section than that of the reactor. As the probe there can be used a capillary made of material resistant to the components of the equilibrium mixture, for example, quartzware or sintered ceramics.

There is especially suited for large apparatus units a method of operation in which the equilibrium mixture is quenched in a quenching chamber directly connected to the reaction zone. A fluid, e.g. a liquid cooling medium is sprayed into the quenching chamber. As quenching medium, there is preferably employed already formed reaction mixture. Inert fluids can also be used as the quenching medium.

The silicon tetrachloride not reacted to hydrogen containing chlorosilanes can be returned to the reaction zone after distillative separation from the hydrogen containing chlorosilanes, e.g. silicochloroform. In a suitable manner, the unreacted portions of the $SiCl_4$ and $H_2$ are replenished before their return to their starting concentrations. In the cyclic process just recited only so much $SiCl_4$ and $H_2$ is fed as is reacted.

The process of the invention in contrast to the known related processes has the advantage that the yield of $SiHCl_3$ based on the $SiCl_4$ is quantitative upon recycling. Furthermore, the $SiHCl_3$ formed is immediately free of halogenation products of the secondary constituents (for example $AlCl_3$ and $TiCl_4$) which are produced from the ferrosilicon employed in the customary manner for the production from $SiCl_4$. Otherwise, their removal causes a considerable expense.

The invention is further explained in connection with the accompanying drawings and the illustrative examples.

Unless otherwise indicated, all parts and percentages are by weight.

Figure 2:
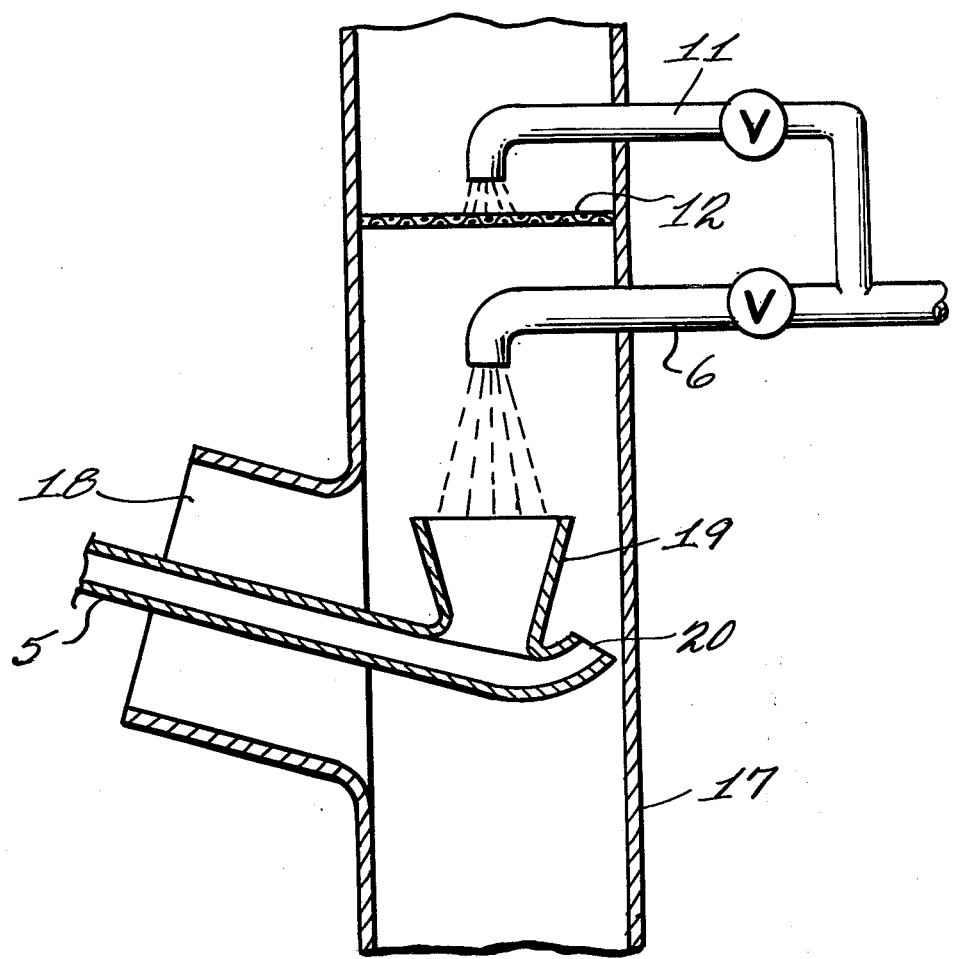

In the drawings:

FIG. 1 is a schematic representation of a plant for the production of the hydrogen containing chlorosilanes $SiHCl_3$ and $SiH_2Cl_2$ according to the probe employing method of carrying out the invention; and FIG. 2 is a schematic representation of the quenching portion of the plant of FIG. 1.

Referring more specifically to FIG. 1, liquid $SiCl_4$ is evaporated in evaporator 1 and is combined in reactor furnace 3, for example, in the molar ratio of 1:5 with hydrogen preheated in heater 2 to about 1100° C. The $SiCl_4$ goes to furnace 3 through conduit 30 and the hydrogen goes through conduit 32.

The prevailing temperature in the electrically heated tubular furnace 3 for establishing the reaction equilibrium is 1100° C. A capillary probe 5 (5 mm circular cross-section) of sintered ceramic ends in the longitudinal axis of the furnace about at the beginning of the last third of the furnace length. It opens at its other end in a quench chamber 4 directly connected to the furnace 3. The quenching apparatus in the quench chamber 4 has the quenching line 6 above the opening of the withdrawing and transporting capillary 5. The quench line is fed from the receiver 8 with chlorosilane mixture taken from the reaction mixture and cooled to about room temperature in cooler 7.

An essentially HCl and $H_2$ containing gas mixture leaves the quench zone in the upward direction through line 34. The hydrogen chloride is a reaction product from the reaction; the hydrogen portion is composed of that added in excess and non-reacted hydrogen. The mentioned gaseous mixture is freed of entrained chlorosilanes and unreacted silicon tetrachloride in brine cooler 9 at about −30° C. The chlorosilanes and silicon tetrachloride drain off through line 36 to receiver 10. In order to maintain the most even temperature distribution in the quench apparatus in the range of the cooling agent from the quench line above the quench line 6, there is provided a helping quench line 11. This is fed from the same liquid source as the quench line 6. In many cases, it is advantageous to provide a screen deck 12 between the two quench lines. The mixture of HCl and $H_2$ separated in the brine cooler goes via line 38 into washing column 13 where it is washed with water entering via line 40. The aqueous hydrochloric acid is withdrawn through line 42. The hydrogen is returned to the heater 2 via line 44 and mixed with fresh hydrogen flowing from line 46. The collective mixture of the hydrogen containing chlorosilanes and silicon tetrachloride in the receiver 10 passes via line 48 to the distillation column 14 equipped with brine cooled dephlegmator 15. The mixture is fractionally distilled. The hydrogen containing chlorosilanes $SiHCl_3$ and $SiH_2Cl_2$ are drawn off from the head of the column via line 8 and accumulated in container 16. The $SiCl_4$ flowing from the bottom of the column is led via line 50 into evaporator 1 and after addition of fresh $SiCl_4$ from line 52 is returned again to the reaction. The hydrogen containing chlorosilanes accumulated in container 16 can be separated by distillation.

In FIG. 2, the quenching apparatus is shown in enlarged form. It consists of a vertical tube 17 provided with a side addition tube 18 in which vertical tube 17 are arranged the opening of the probe 5, the quench pipe 6, the screen deck 12 and the assistant quench pipe 11 are arranged on top of each other. The tube 18 is directly connected with its closed end, through which only the capillary probe passes, to the reaction furnace 3. The opening of the probe here consists of a pipehead like enlargement 19 of the probe jacket opening upwardly an overflow opening 20 at the bottom of this enlargement. The construction part 12 provides for a special distribution of the liquid of the assistant quench in case this is necessary. The overflow 20 lets the liquid material collected in the probe head flow off. Both last mentioned parts in most cases are not necessary.

Within the scope of the invention, various variations of the apparatus can be used which employ these principles. The following examples describe the use of one of these variants.

EXAMPLE 1

26 liters of hydrogen per hour were saturated with $SiCl_4$ at −20° C. in a $SiCl_4$ evaporator. Leaving the evaporator is a $SiCl_4/H_2$ gas mixture of the molar composition 1:10. This is led through a gas tight carbon tube uniformly heated electrically to 800° C. and having an isothermal reaction chamber 34.2 cm long 4.0 cm in diameter. The reaction volume of the reactor was 430 ml, the residence time of the reaction mixture about 15 seconds. The reaction mixture was delivered from the reaction chamber with the help of reduced pressure by way of a 600 mm long capillary of quartzware having a 3 mm circular cross-section at a speed of flow of 4 meters/second inside 0.15 second and quenched to a temperature below 300° C. by flowing through a heat exchanger cooled to a temperature of 20° C. and made of highly alloyed steel plates. The capillary is drawn at the exit separately in split form. The gas stream hits on a cooled rotating cylinder of VA sheet metal before the split. The residual hydrogen after the addition of fresh hydrogen is again returned to the reactor. The silane mixture obtained consisted of 13.3 mol % of $SiHCl_3$ and 87.7 mol % $SiCl_4$. It was separated by fractional distillation, whereupon the $SiCl_4$ was returned to the reactor.

EXAMPLE 2

18 liters of hydrogen per hour were led through a $SiCl_4$ evaporator thermostatically controlled at 10° C. whereby the hydrogen became saturated with $SiCl_4$. The gas mixture leaving the evaporator had a molar composition of $SiCl_4:H_2$ corresponding to 1:5. The gas mixture was heated to a temperature of 1100° C. in a quartzware tube with an isothermal reaction chamber having a length of 34.2 cm and a diameter of 40 cm. The residence time was about 15 seconds. The reaction mixture was discharged from the reactor into a quench chamber according to FIG. 2 (flow velocity; 4 meters/sec., discharge time space 0.15 seconds) and cooled instantaneously at this place by spraying in an amount of 500 grams/minute at 15° C. condensed, crude $SiCl_4$/$SiHCl_3$ formed in the reaction.

The quench apparatus of FIG. 2 permits the hot reaction gases at the equilibrium temperature to be quenched in an instant below 300° C. by intensive mixing with a jet spray. The outlet end of the gas probe is enlarged in pipehead manner. The spray jet is so dimensioned that the entire cross-section of the outlet is sprayed and the chlorosilanes in the reaction gases are already extensively condensed. Residual chlorosilane portions are condensed in the surrounding space which is cooled by the spray jet of the assistant quench. The silane mixture obtained consisted of 29.5 mol % $SiHCl_3$ and 70.5 mol % SiCl$_4$. It was fractionally distilled as, in example 1 and the SiCl$_4$ returned to the evaporator.

EXAMPLE 3

A gas mixture of SiCl$_4$:H$_2$ corresponding to a molar ratio of 1:5 (284 grams of SiCl$_4$/hour and 186 liters of H$_2$/hour) were led as in example 1 and 2 through a reactor heated to 1100° C. and coated by activated carbon (Supersorbon WS4 of Degussa). The residence time was 1.5 seconds at a free reaction volume of 430 ml. The reaction products were again led out within 0.05 second at a flow velocity of 12 meters/second with the help of a reduced pressure by way of a 600 mm long capillary having a 5 mm circular cross-section and made of sintered ceramic and the products were quenched instantaneously to a temperature below 300° C. with the aid of heat exchanger surfaces of high alloyed steel at a temperature of −20° C. The time in which the temperature passes from 1100° C. to the quench temperature is 0.05 second. The reaction mixture consists of 37.1 mol % SiHCl$_3$, 62.3 mol % SiCl$_4$ and 0.6 mol % SiH$_2$Cl$_2$. The separation of the chlorosilanes took place as in examples 1 and 2. The unreacted SiCl$_4$ was again returned to the evaporator and then to the reaction zone.

By room temperature is meant a temperature of about 20° C.

We claim:

1. A process of producing hydrogen containing chlorosilanes in which silicochloroform is the predominant chlorosilane formed consisting essentially of reacting SiCl$_4$ with H$_2$ in the presence of activated carbon catalyst at 600° to 1200° C. with a residence time in the reaction zone of 0.5 to 20 seconds to form a reaction equilibrium mixture containing SiCl$_4$, H$_2$, SiHCl$_3$ and HCl and activated carbon in which process the molar ratio of SiCl$_4$/H$_2$ is between 1:1 and 1:50, then quenching the reaction mixture to below 300° C., in less than 1 second and then separating the SiHCl$_3$ formed from the reaction mixture.

2. A process according to claim 1 including the steps of condensing the chlorosilanes, separating the hydrogen and hydrogen chloride from the condensed chlorosilanes and separating the condensed chlorosilanes by fractional distillation.

3. A process according to claim 1 including the step of returning unreacted, separated hydrogen to the reaction.

4. A process according to claim 1 wherein the reaction equilibrium is established at 900° to 1100° C.

5. A process according to claim 4 wherein the molar ratio SiCl$_4$/H$_4$ is between 1:3 and 1:15.

6. A process according to claim 5 wherein the residence time in the reaction zone is 0.5 to 2.0 seconds.

7. A process according to claim 5 wherein the quenching time is 0.05 to 0.5 second.

8. A process according to claim 1 wherein there is used a quenching temperature below room temperature.

9. A process according to claim 1 wherein the quenching is carried out by spraying fluid cooling medium into the equilibrium mixture immediately after it leaves the reaction zone.

10. A process according to claim 9 wherein the quenching medium is cooled reaction mixture.

11. A process according to claim 1 wherein unreacted silicon tetrachloride is returned to the reaction zone.

12. A process according to claim 1 consisting of reacting SiCl$_4$ with H$_2$ in the presence of activated carbon catalyst to produce said equilibrium mixture, then quenching the reaction mixture to below 300° C. and then separating the SiHCl$_3$ formed from the reaction mixture.

* * * * *